United States Patent
Urbano (10) Patent No.: US 9,968,844 B2
(45) Date of Patent: May 15, 2018

(54) SERVER AND USER DEVICE FOR PROVIDING A COMPUTER IMPLEMENTED GAME REWARD

(71) Applicant: KING.COM LIMITED, St. Julians (MT)

(72) Inventor: Francisco Urbano, Barcelona (ES)

(73) Assignee: KING.COM LTD., St. Julians (MT)

( * ) Notice: Subject to any disclaimer, the term of this patent is extended or adjusted under 35 U.S.C. 154(b) by 498 days.

(21) Appl. No.: 14/580,451

(22) Filed: Dec. 23, 2014

(65) Prior Publication Data

US 2016/0175706 A1 Jun. 23, 2016

(51) Int. Cl.
| | |
|---|---|
| G06Q 30/02 | (2012.01) |
| G06F 17/30 | (2006.01) |
| A63F 13/216 | (2014.01) |
| A63F 13/533 | (2014.01) |
| A63F 13/69 | (2014.01) |
| A63F 13/213 | (2014.01) |
| A63F 13/215 | (2014.01) |

(52) U.S. Cl.
CPC .......... *A63F 13/213* (2014.09); *A63F 13/215* (2014.09); *A63F 13/216* (2014.09); *A63F 13/533* (2014.09); *A63F 13/69* (2014.09)

(58) Field of Classification Search
None
See application file for complete search history.

(56) References Cited

U.S. PATENT DOCUMENTS

| | | | | |
|---|---|---|---|---|
| 6,417,435 | B2 * | 7/2002 | Chantzis | G09B 15/04 84/477 R |
| 7,806,759 | B2 * | 10/2010 | McHale | A63F 13/10 463/7 |
| 8,595,015 | B2 * | 11/2013 | Lee | G10L 15/26 434/156 |
| 2009/0038467 | A1 * | 2/2009 | Brennan | G09B 5/00 84/609 |

* cited by examiner

*Primary Examiner* — Jeffrey A Gaffin
*Assistant Examiner* — Nhat-Huy T Nguyen
(74) *Attorney, Agent, or Firm* — Saul Ewing Arnstein & Lehr LLP (57) ABSTRACT

A method is provided where a user device has a display which displays a message. This message prompts a user to provide an audio input which is captured by a microphone. The audio input is processed to determine the content. The content is compared to the expected content and if a match is determined then a reward is provided. The reward may be a reward in a computer implemented game which is run on the user device.

14 Claims, 4 Drawing Sheets

SERVER AND USER DEVICE FOR PROVIDING A COMPUTER IMPLEMENTED GAME REWARD

FIELD OF THE INVENTION

Some embodiment relate to a user device and a server for use in playing a computer implemented game.

BACKGROUND OF THE INVENTION

Designers of computer games face significant technical challenges when designing games for so called "social" or "casual" gaming.

One such technical challenge is that of user engagement. Engagement involves designing gameplay to be engaging and rewarding for players. Typically designing games to be engaging requires providing gameplay that is at first simple yet increases in complexity so that players are rewarded and retain interest through increasing skill development and challenges.

Often, particularly in a field where there are numerous competing games, users require further means of engagement to retain their interest. This could involve providing feedback to the user to reinforce their achievements and successes or to provide new ways of engaging and stimulating a user's interest.

Therefore, there are many technical challenges faced when designing computer implemented games, particularly when attempting to design a game that is engaging, challenging and, ultimately, rewarding the user so as to provoke repeat play without disengaging or frustrating the user.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF INVENTION

According to an aspect, there is provided a method for providing a computer implemented game in a user device, the user device comprising at least one processor, a user input and a display, the method comprising: receiving from a server information defining an audio input to be requested from a user; displaying a message on the display relating to the requested audio input; capturing by the user input an audio input provided by the user; processing the captured audio input to determine a content of the captured audio input; comparing the requested audio input and the content of the captured audio input; and in response to determining a match between the requested audio input and the content of the captured audio input, providing at least one game input for the computer implemented game.

The requested audio input may comprise one or more predetermined words.

The displayed messages may comprise the one or more predetermined words.

The method may comprise providing the at least one game input if a match is determined and if one or more other criteria is satisfied.

The one or more other criteria may comprise one or more of: location, time and date.

In some embodiments, one or more game conditions need to be satisfied.

In some embodiments one or more social network criteria need to be satisfied.

In some embodiments, the processing of the captured audio content may be performed at the server to determine the content of the captured audio input.

In some embodiments, the comparing of the requested audio input and the content of the captured audio input may be performed in the server.

In some embodiments, the providing at least one game input for the computer implemented game may comprise receiving information associated with the game input from the server.

According to another aspect, there is provided a method performed in a server, the server being arranged to communicate with a user device providing a computer implemented game, the method comprising: transmitting from the server to a user device information defining an audio input to be requested from a user; receiving from the user device an audio input provided by the user; processing the audio input to determine the content of the captured audio input; comparing the requested audio input and the content of the captured audio input; and in response to determining a match between the requested audio input and the content of the captured audio input, transmitting information to the user device to provide at least one game input for the computer implemented game.

In some embodiments, the processing of the captured audio input may be performed at the user device. The server may receive the content of the captured audio input instead of the audio input.

According to an aspect, there is provided a user device comprising: a receiver configured to receive from a server information defining an audio input to be requested from a user; a display configured to display a message on the display relating to the requested audio input; a user input configure to capturing an audio input provided by the user; and at least one processor configured to process the captured audio input to determine a content of the captured audio input, to compare the requested audio input and the content of the captured audio input, and in response to determining a match between the requested audio input and the content of the captured audio input, to provide at least one game input for the computer implemented game.

The requested audio input may comprise one or more predetermined words.

The displayed message may comprise the one or more predetermined words.

The processor may be configured to provide the at least one game input if a match is determined and if one or more other criteria is satisfied.

The one or more other criteria may comprise one or more of: location, time and date.

According to an aspect, there is provided a server comprising: a transmitter configured to transmit to a user device information defining an audio input to be requested from a user; a receiver configured to receive from the user device an audio input provided by the user; a processor configured to process the audio input to determine the content of the captured audio input, and to compare the requested audio input and the content of the captured audio input, wherein in response to the processor determining a match between the requested audio input and the content of the captured audio input, the transmitter is configured to transmit information to the user device to provide at least one game input for a computer implemented game run on said user device.

According to an aspect, there is provided a method for providing a computer implemented game in a user device, the user device comprising at least one processor, a user input and a display, the method comprising: receiving from a server information defining an input to be requested from a user and one or more additional criteria; displaying a message on the display relating to the requested input; capturing by the user input an input; processing the input to determine the content of the captured input; comparing the requested input and the content of the captured input; determining if the one or more additional criteria are satisfied; and in response to determining a match between the requested input and the content of the captured input and satisfying of the one or more additional criteria, providing at least one game input for the computer implemented game.

The data captured by the user input may comprises an image or an audio input.

The image may comprise one or more of a barcode, an image of a location, an image of an item and an image of an event.

The one or more additional criteria may comprise one or more of: location, time and date.

According to another aspect, there is provided a method performed in a server, the server being arranged to communicate with a user device providing a computer implemented game, the method comprising: transmitting to the user device from the server information defining an input to be requested from a user and one or more additional criteria; receiving from the user device an input captured by a user input of said user device; processing the captured input to determine the content of the captured input; comparing the requested input and the content of the captured input; determining if the one or more additional criteria are satisfied; and in response to determining a match between the requested input and the content of the captured input and satisfying of the one or more additional criteria, transmitting information to the user device to provide at least one game input for the computer implemented game.

According to an aspect, there is provided a user device, the user device comprising: a receiver configured to be receive from a server information defining an input to be requested from a user and one or more additional criteria; a display configured to display a message on the display relating to the requested input; a user input configured to capture an input by the user; and at least one processor configured to process the input to determine the content of the captured input, to comparing the requested input and the content of the captured input, to determine if the one or more additional criteria are satisfied, and in response to determining a match between the requested input and the content of the captured input and satisfying of the one or more additional criteria, providing at least one game input for a computer implemented game run on said user device.

The data captured by the user input may comprises an image or an audio input.

The image may comprise one or more of a barcode, an image of a location, an image of an item and an image of an event.

The one or more additional criteria may comprise one or more of: location, time and date.

According to another aspect, there is provided a server comprising: a transmitter configured to transmit to a user device information defining an input to be requested from a user and one or more additional criteria; a receiver configured to receive from the user device an input captured by a user input of said user device; and at least one processor configured to process the captured input to determine the content of the captured input, to compare the requested input and the content of the captured input, to determine if the one or more additional criteria are satisfied, wherein the transmitter is configured in response to the at least one processor determining a match between the requested input and the content of the captured input and satisfying of the one or more additional criteria, to transmit information to the user device to provide at least one game input for a computer implemented game run on said user device.

According to an aspect, there is provided a computer implemented method, the method comprising the following implemented by at least one processor in a user device: receiving information, said information being provided from data captured by a user device; processing the information to determine if one or more criteria is satisfied and if so providing at least one game input for a computer implemented game supported by the user device.

The data captured by the user device may comprise image data.

The image may comprises one or more of a barcode, an image of a location, an image of an item and an image of an event.

The one or more criteria may be satisfied if the image is a predetermined image.

The data captured by the user device may comprise audio data.

The one or more criteria may be satisfied if the audio data comprises one or more predetermined words.

The method may comprise providing a message to the user device to cause a prompt for the capture of the data by the user device.

The method may comprise displaying a message on a display of the user device as said prompt.

The method may comprise processing the information to determine if the one or more additional criteria is satisfied and if said one or more additional criteria is satisfied providing at least one game input for a computer implemented game supported by the user device.

The one or more other criteria may comprise one or more of: location, time and date.

The method may comprise receiving data from the user device, the data being used to determine if the one or other criteria is satisfied.

BRIEF DESCRIPTION OF DRAWINGS

To understand some embodiments, reference will now be made by way of example only to the accompanying drawings, in which.

DETAILED DESCRIPTION OF EMBODIMENTS

The terms user and player are used interchangeably throughout this document and no specific meaning is intended using one or the other unless the context suggests otherwise. A person skilled in the art will realise that the different approaches to implementing the embodiments are not exhaustive, what is described herein are certain preferred embodiments.

Figure 1:
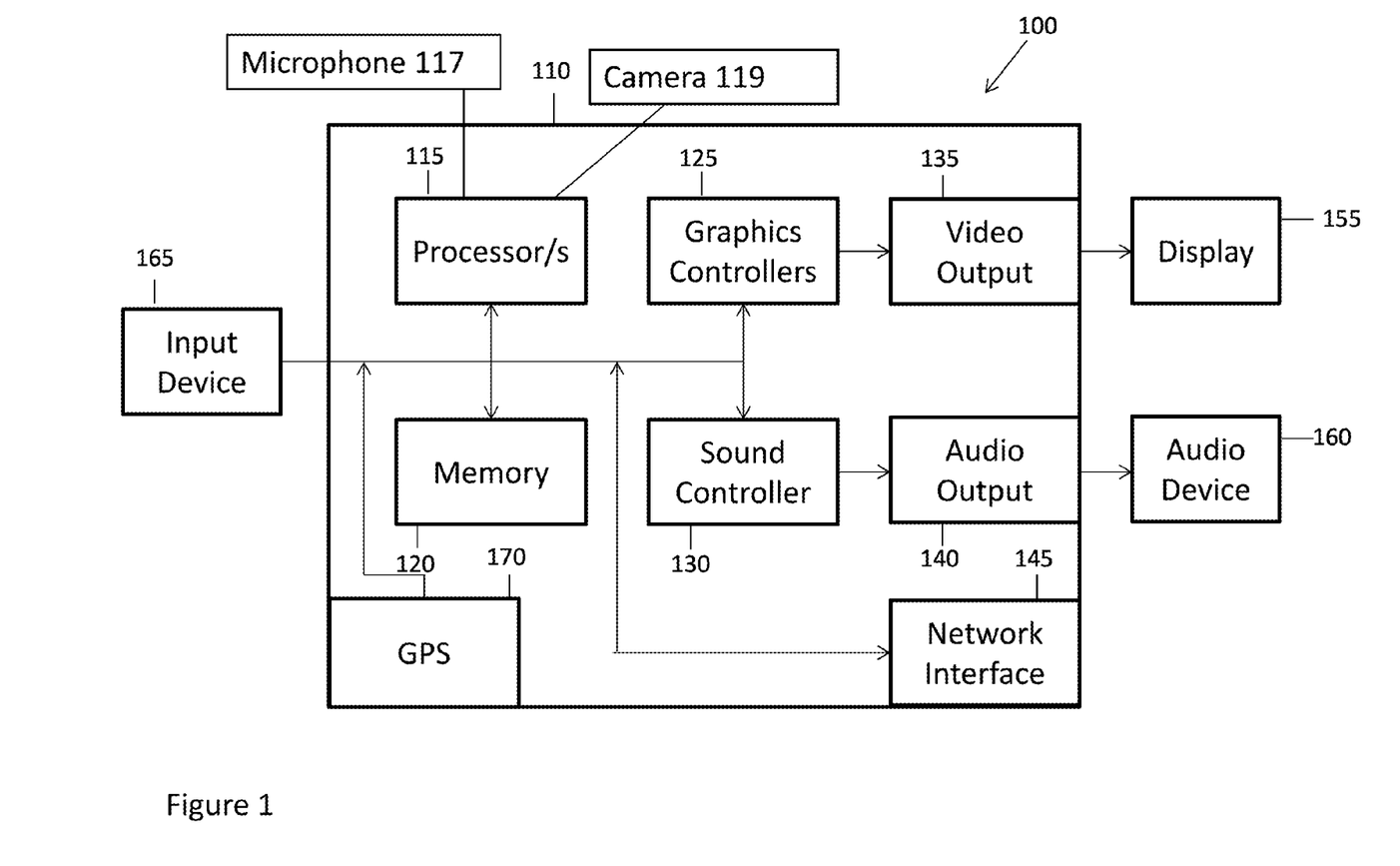
FIG. 1 illustrates an example client or user device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part may be implemented by one or more processors 115 and one or more memories 120.

The control part 110 is shown as having a graphics controller 125 and a sound controller 130. It should be appreciated that one or other or both of the graphics controller 125 and sound controller 130 may be provided by the one or more processors 115 or may be separately provided. The graphics and sound controllers may comprise memory and/or may operate in conjunction with the one or more memories 120.

The graphics controller 125 is configured to provide a video output 135. The sound controller 130 is configured to provide an audio output 140. The video output 135 is provided to a display 155. The audio out 140 is provided to an audio device 160 such as a speaker and or earphone(s).

An audio capture device such as a microphone 117 may be provided. An audio input may be captured by the microphone and may be processed by the processor and/or any other suitable processor. The audio input which is captured may be stored in the form of an audio file. The audio input may be processed by a speech recognition program. The speech recognition program may be stored in the memory and may be run by the processor. The processing of the captured audio data may allow the words in the captured audio input to be determined.

In other embodiments, the sound controller and audio device may additionally capture and process audio data.

An image capture device 119 may be provided. The image capture device is a camera in some embodiments. The image captured by the camera may be processed by the processor and/or any other suitable processor. The image input which is captured may be stored in the form of an image file.

The control part 110 has an interface 145 allowing the device to be able to communicate with a network such as the Internet or other communication infrastructure. The control part 110 has a GPS module 170 or similar configured to provide location information to the at least one processor 115 or memory 120.

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
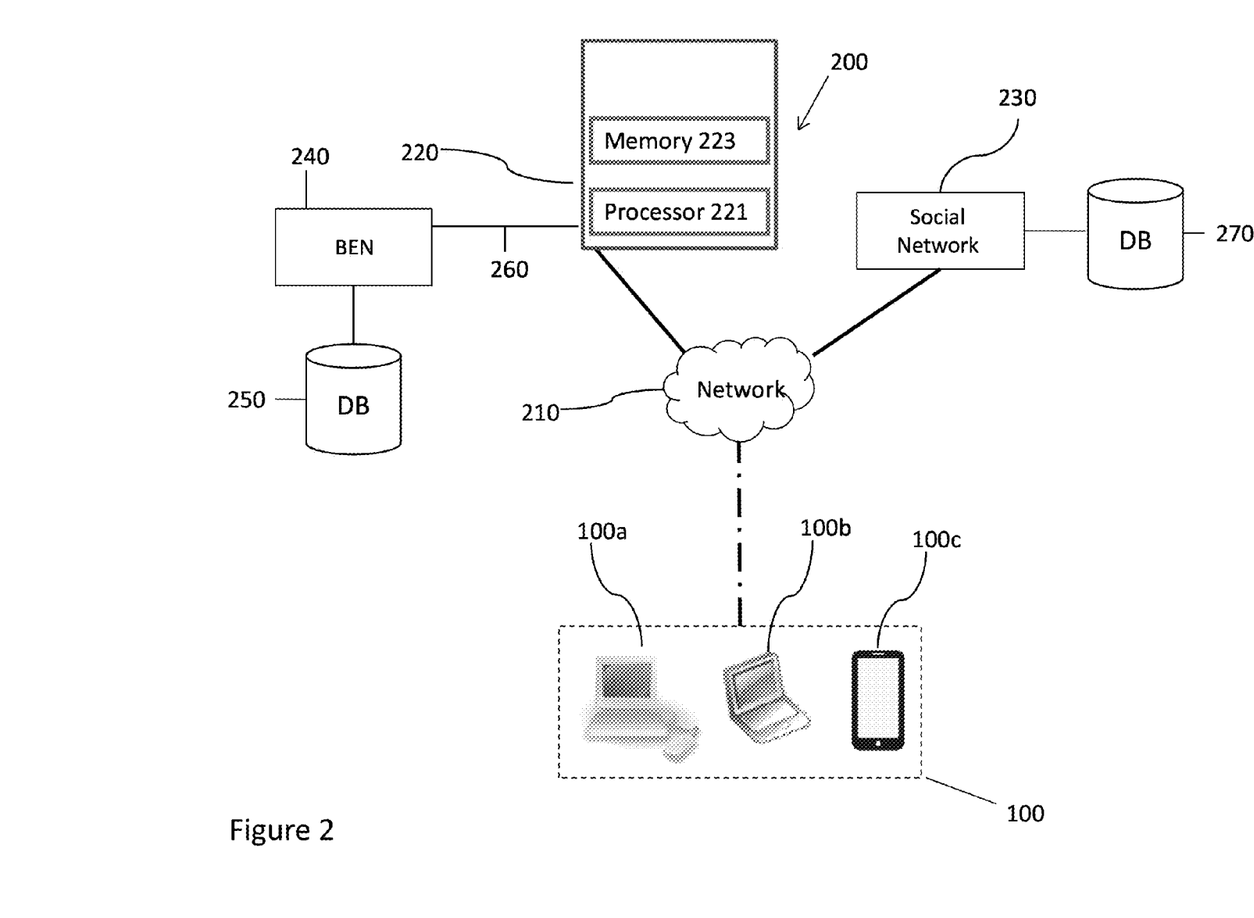
FIG. 2 illustrates an example system in which some embodiments may be provided.

FIG. 2 schematically shows a system 200 according to an embodiment. The system 200 comprises a server 220 which may store or be in communication with database 250 which may, in some embodiments, be connected to a back end infrastructure (BEN) of game player's details, profiles, statistics etc. In practice, one or more databases 250 may be provided. In practice, one or more servers 220 may be provided. Where one or more server is provided, the database(s) 250 may be provided in one database 250 across two or more servers. The server(s) 220 may also have a games data function. This may comprise one or more units of memory 221 to store the computer game program, user behaviour data and a control part to run the games program and process the user behaviour data. The control part may comprise one or more processors 221.

The server 220 may communicate via, for instance, the internet 210 to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 100.

It should be recognised by those skilled in the art that the databases herein referred to may comprise external or remote storage, such as that described as being in a "cloud".

Figure 3:
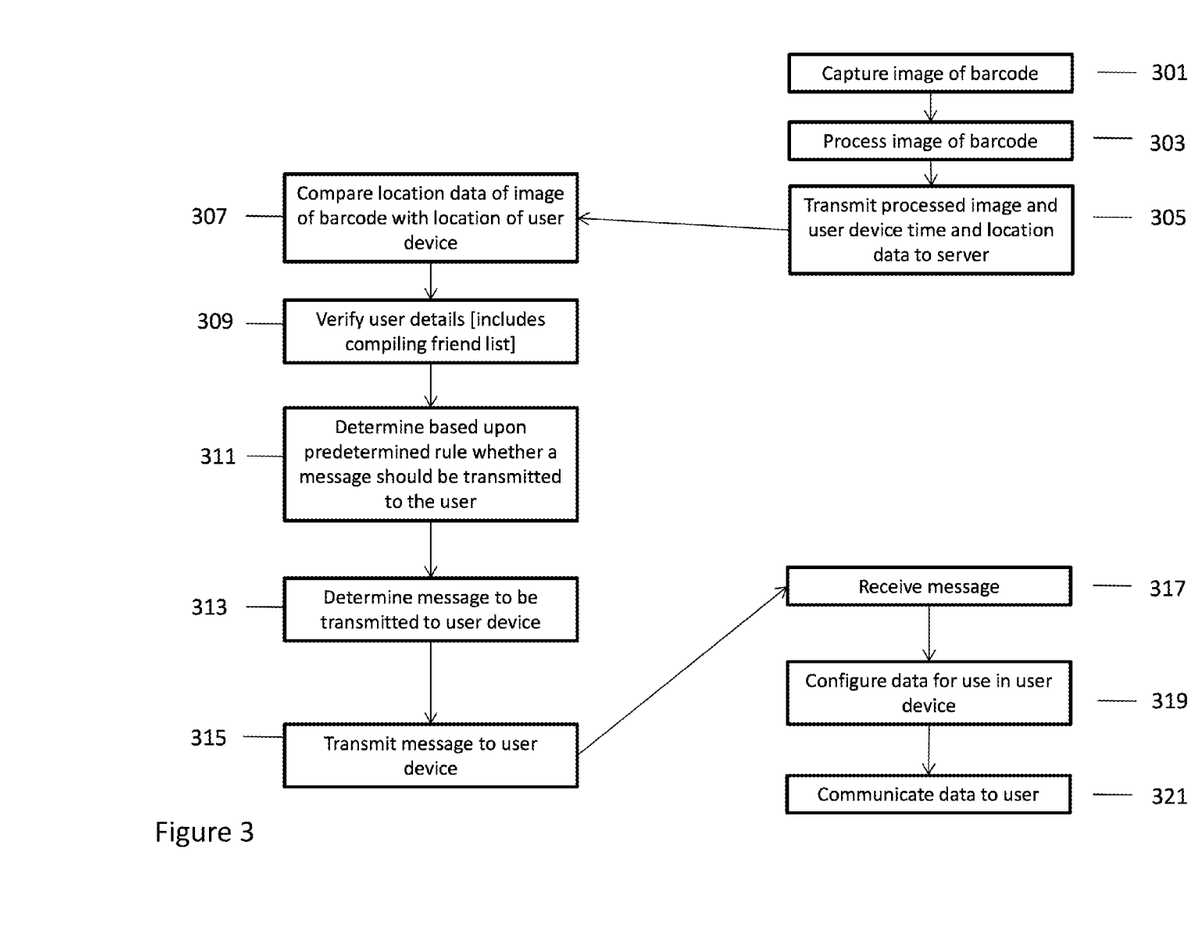
FIG. 3 illustrates a flowchart illustrating the steps of a method according to a first embodiment.
Figure 4:
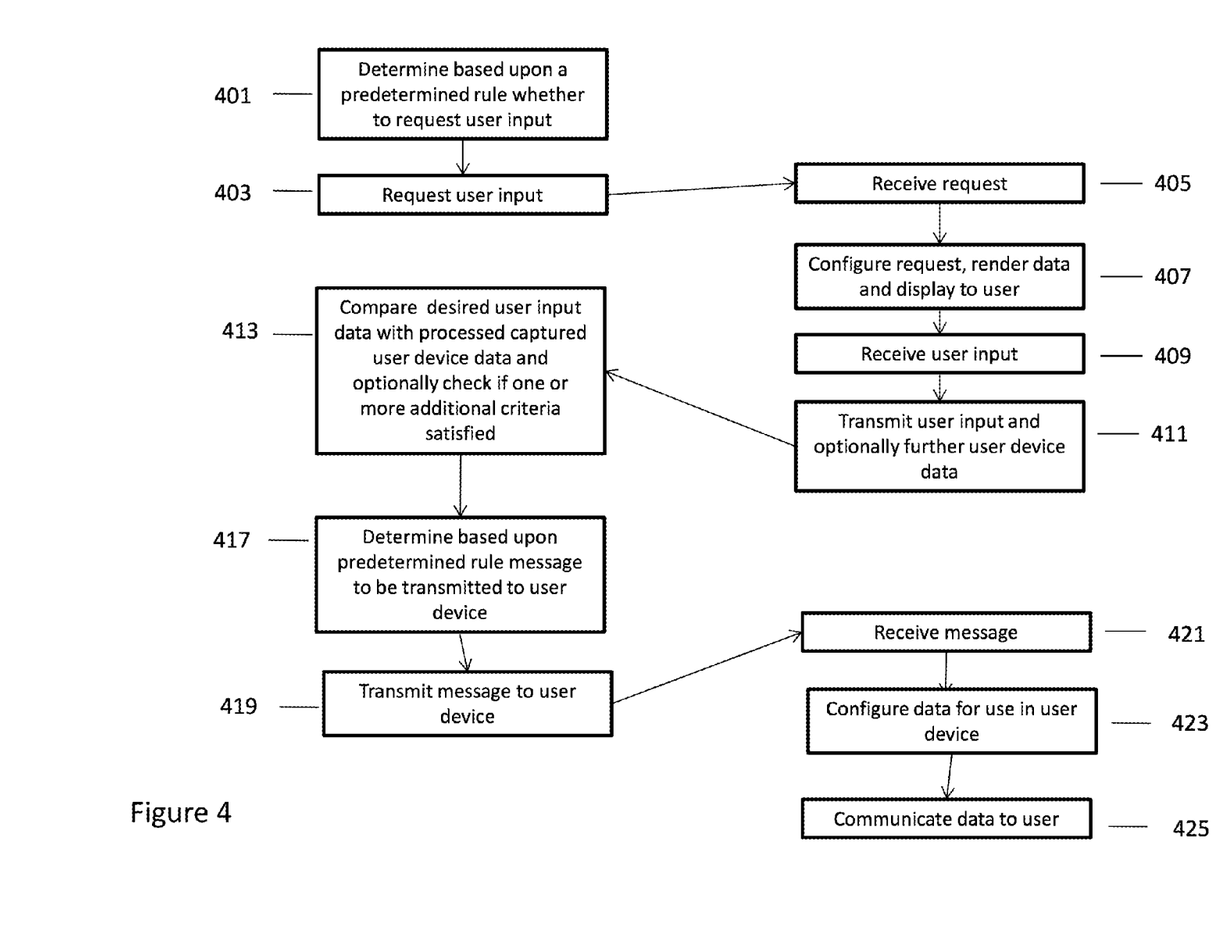
FIG. 4 illustrates a flowchart illustrating the steps of a method according to a second embodiment.

FIGS. 3 and 4 show methods of communicating and interacting with an application. The application may be a computer implemented game. In particular, the methods enable users to interact with an application to perform interactive tasks comprising triggers to generate rewards. The user may interact through a user device. The user device may, for instance, be a mobile communications device, tablet or laptop. The user device may comprise a touchscreen.

FIG. 3 illustrates a flow diagram describing a method performed by a control part within a server 220, 230 in response to a user to capturing and submitting an image. Alternatively some or all of the steps may be performed by a control part of a user device 100.

Step 301 involves a user capturing an image of a Quick Response (QR) barcode or two dimensional bar code by the user device 100. In some embodiments, the image captured may not be a QR barcode. The captured image may be at least one an image of a location, a non-QR barcode i.e. a one-dimensional barcode, a specific item, an image of an event or place.

The user may be prompted by the user device to capture the required image. This prompting may be in the form of a visual and/or audio message which is provided by the user device. For example, a message is displayed by the display and/or played by the audio device. This message which may be displayed or provided by an audio output will prompt the user to capture the required input with the camera.

The prompting by the user device may be caused by one or more of the following: information is received from the server; a trigger point in a game is reached; a particular location is determined; and a particular time occurs.

In some embodiments, information is provided by the server. This information may be the information relating to the message, data which is to be captured and/or an identifier. The user device may pre-store information about a plurality of different images to be captured each of which is associated with a different identifier. Information from the server may identify which of the pre-stored options is required.

Those skilled in the art will appreciate that the use of other captured images may be suitable.

In step 303, the user device processes the QR barcode by extracting data embedded within the barcode. The embedded data may comprise any suitable data and may comprise one or more: information which identifies the QR barcode; information about a location; information about a time; and/or any other suitable data.

As mentioned, the embedded data may include location data. The location data may be at least one of GPS data or other data. Alternatively, or additionally, the embedded data may include at least one of time data or date data.

Should the image not be a QR barcode, the image may be processed in other ways, for example, extracting key content information from an image. This key information may be a key part of the image. The key content information may be a specific entity in the image, for example, that the image contains the Eiffel Tower and/or specific text/numbers. Alternatively, or additionally, the key content information may be or a specific item/event.

In some embodiments, the processing of step 303 is carried out in the server (if the server is processing the image, the captured data is transmitted to the server for processing).

In step 305, the extracted data from the barcode is transmitted to the server 220, 230. In some embodiments additional data from the user device may also be transmitted to the server. The additional data transmitted from the user device may include at least one of GPS data, time data, and date data. Alternatively, in some embodiments the extracted information may not be sent to the server and instead be transmitted to the memory 120 of a user device 100.

In step 307, which is optional in some embodiments, the processor of the server 220, 230 may compare the extracted data from the image with expected data. For example if the QR code has an identifying code, the extracted data is examined to see if it has the expected code. Alternatively, the extracted data may be analysed to determine if it contains the required image or the like.

In some embodiments, the extracted data may alternatively or additionally be compared with the additional data from the user device 100 to verify that they match. This may be used in the case where the QR code may additionally or alternatively contain desired location and/or time information. The match may be determined based on a comparison of the extracted data and the additional data from the user device. The comparison may compare the extracted data with corresponding data from the user device 100, for example, comparing the location of the extracted data with the location of the user device 100.

Alternatively, or additionally, the extracted data may be compared with the desired data. A further check is made to see if additional data provided from the user device satisfies one or more additional criteria. Those additional criteria may comprise one or more of location and time.

In some embodiments, all or part of step 307 may be performed by the processor/control part of the user device accessing the extracted data within the user device 100, for example, stored in the memory 120 of the user device 100.

In some embodiments, a user is prompted to go to a particular location in order to capture a particular image. This may be at a particular time. To verify that the user is actually at the particular location, location data captured by the GPS or similar device is used. The required location data may be part of the QR code or may be separately communicated if the verification is done at the user device. If the verification is done at the server, then the server may have separate information as to the required location or may use information which is part of the QR code to determine if the location criteria is satisfied. The requirement of the image to be captured at a particular time may be dealt with similarly.

In step 309, the control part of the server 220, 230 compiles details of the user login presently associated with the user device 100. This step may be optional in some embodiments.

Users may have a number of ways of identifying themselves on a database, for example, email login, social network login, which can give rise to a number of different accounts. In this instance, user verification through login via a social network such as Facebook™ may be used.

The control part of the server communicates via the network 210 with the social network 230. The authentication previously provided by the user to access the content on the user device 100 is provided to the social network 230. The social network verifies the authentication associated with the user and verifies the user login. Verifying the user login may require the social network to access the database 270. Compiling details of the user login associated with the user device 100 may also involve compiling a list of friends or activities of the user login. Compiling details of the user login may further comprise obtaining information about the social interactions of the user, for example, the users' "friend list". Compiling details of the user login may further comprise the number of "shares" or "likes" of the user. The number of "shares" or "likes" may be in relation to an event, for example, how many times the user has liked a company or game. The number of "shares" or "likes" may be specifically in relation to the extracted data associated with the image captured by the user device 100. This is optional in some embodiments.

In some embodiments, some or all of the steps of compiling details of the user login presently associated with the user device 100 may be performed by the control part 115 of the user device, the user device accessing the social network 230 via the network 210. Alternatively, control part 115 may compile details of the user login through accessing a local copy of the database 270 of the social network 230.

In step 311, the control part of the server 220, 230, determines according to a predetermined rule whether a message should be transmitted to the user device 100. The predetermined rule may be based upon at least one of, or any combination thereof, the data has been captured at a required location, the data has been captured at a required time, the desired image has been captured, the code in a QR image matches a desired code, whether the extracted data of the image matches the data of the user device, the number of friends a user has shared the image or image location with, the number of times a user has submitted an individual QR barcode, the number of total images submitted by a user, the number of a collection of certain images the user has submitted, the number of "shares" or "likes" of a company or game, the number of posts by a user etc.

In some embodiments, it is enough that the desired image has been captured.

In some embodiments one or more additional criteria associated with the capture have to be satisfied such as location and/or date.

In some embodiments, one or more game conditions need to be satisfied.

In some embodiments one or more social network criteria need to be satisfied.

Depending on the requirements being satisfied (which may be any one or combination of the above options) a message may be transmitted.

In some embodiments a message may be automatically transmitted if the extracted or processed data complies with the rule. Optionally, in step 313, if the control part in step 311 determines that the extracted or processed data complies with the rule, the control part of the server 220, 230 determines what message should be transmitted. This message could comprise, but is not limited to, at least one of:

promotional offers, for example, a promotional code or voucher, game lives, special features, new characters, special power-ups, secret levels, forum access, an unlock code for secret areas of a game, information about how many people in a geographic location have also submitted the image(s), a ranking for the user login.

The ranking may be based upon how many users have previously submitted the image, the furthest distance from their "home" a user has submitted an image, how many images in total have been submitted, how many images are left to be submitted.

The message provided may be a combination of the options, for example, a ranking in the top 10 which leads to the message also containing a promotional offer.

The message may have an interaction with the game. The message may be transmitted from the server and received by the user device. Depending on the message, the user device will be appropriately controlled in response thereto.

In some embodiments, the user device may be determining the satisfying on the one or more criteria and the message may be generated by the processor to cause the user device to appropriately respond.

If in step 311, the control part has determined that the extracted data does not comply with the predetermined rule the control part of the server 220, 230 determines what message should be transmitted. This message could comprise, but is not limited to, at least one of:

sending instructions on how to meet the predetermined rule, how many more images are required to meet the predetermined rule, instructions that the user has already received the message associated with the current extracted data, instructions comprising clues or hints as to how to meet the predetermined rule, instructions comprising clues or hints as to how to achieve another reward, etc.

In some embodiments, all or part of step 313 may be performed by the control part of user device 100 by accessing predetermined rules stored within the user device 100.

In step 315, the message is transmitted to the user device 100. In some embodiments where the previous steps are performed by the control part 115 of the user device 100 no message needs to be sent to the user device. Instead the control part of the user device 100 proceeds directly to step 319.

In step 317, the user device 100 receives the message. The message may cause one or more computer executable instructions to be run. In some embodiments, a message or information may be displayed to the user device to indicate that a particular reward has been provided or is available.

In step 319, the control part 115 of the user device 100 configures the data within the message for use in the user device 100. Configuring the data for use in the user device 100 may comprise rendering or altering data into a format that can be used by another feature of the user device, for example, rendering the data in the message for display on the display 155 of the user device in combination with the graphics controller module 125 and video output module 135, and/or configuring the data into audio signals for output by the user device through the audio device 160. Alternatively, or additionally, configuring the data for use on the user device 100, may comprise configuring the message into instructions for a game module on the user device 100. In some embodiments, the control part of the server 220, 230 may configure the data so that it is transmitted in a useable form.

In step 321, the data is communicated to the user. Communicating the data to the user may comprise displaying data on the display 155 of the user device 100. Alternatively, or additionally, communicating data to the user may comprise producing sound through the audio output 160 of the user device 100.

It will be appreciated that the options herein described can be used in isolation or in combination with each other. Furthermore, the split of functions can change and be performed by either the processor in the server or user device.

FIG. 4 illustrates a flow diagram describing steps taken by a control part within a server 220, 230 or a control part of a user device 100 in response to a user receiving a request for a user input and subsequently providing a user input.

Users may have a number of ways of identifying themselves on a database, for example, email login, social network login, which can give rise to a number of different accounts. In this instance, user verification through login via a social network such as Facebook™ such as previously described. In other embodiments, this may be omitted.

In step 401, a control part of a server 220, 230 determines whether to request a user input based upon a predetermined rule. The predetermined rule may result in the selection of individual users. Alternatively, the predetermined rule may result in the selection of a subset of users. The predetermined rule can be based upon any criterion or criteria. The subset of users may be selected based upon a criterion. The criterion may be based upon user data of the user device, for example, one or more of location, time, date, user login details. Alternatively, or additionally, the criterion may be based on a threshold, for example, that the user has a certain number of "friends" in a "friend list", or a certain number of overall "shares" or "likes", or the number of "posts" by the user etc. The criterion may be related to a specific event, for example, that a user has performed a certain number of "shares" or "likes" in relation to a designated company or game. The criterion may be combined to form a more complicated predetermined rule based on a number of criteria.

Alternatively, users may be selected at random.

In step 403, a user request is sent from the server 220, 230 to the selected user device(s) 100. The request may comprise instructions for a user to speak a phrase or word, for example, say "I love Candy Crush", say "I love the bubble witch" or the request may comprise instructions to make a sound, for example, cheering.

In some embodiments, information is provided by the server. This information may be the information relating to the message which is to be captured and/or an identifier. The user device may pre-store information about a plurality of different words or phrase to be captured each of which is associated with a different identifier. Information from the server may identify which of the pre-stored options is required.

In step 405, the control part 115 of the user device 100 configures the data within the user request for use in the user device 100. Configuring the data for use on the user device 100, may comprise displaying instructions to the user. Configuring the data for use on the user device 100, may comprise translating the request into a language corresponding with the user's login details. Alternatively, or additionally, configuring the data for use in the user device 100 may comprise rendering or altering data into a format that can be used by another feature of the user device, for example, rendering the data in the message for display on the display 155 of the user device in combination with the graphics controller module 125 and video output module 135, or configuring the data into audio signals for output by the user device through the audio device 160. Alternatively, or additionally, configuring the data for use on the user device 100 may comprise configuring the user request into instructions for a game module on the user device 100. In some embodiments, the control part of the server 220, 230 may configure the data so that it is transmitted in a useable form.

In step 407, displaying the request to the user can comprise a visual message displayed on the screen of the user device displayed by using the graphics controller 125 and video output 135 to output the image the display 155. The request may be displayed as audio content using the sound controller 130 and audio output 140. The request may be displayed as a combination of sound and audio. The request may be displayed as an icon that represents a request, for example, a padlock which, when activated by a user, for example, by pressing the icon on a touch screen, displays the request.

In step 409, the microphone of the user device 100 receives the user input. The user input is then processed by the control part of the user device 100. The user input may be an audio input. The input device may capture a spoken word or phrase or sung word or phrase or music. As mentioned previously, the request may comprise instructions for a user to speak a phrase or word, for example, say "I love Candy Crush", say "I love the bubble witch" or the request may comprise instructions to make a sound, for example, cheering. The input device is configured to capture the user's response to the request. The audio input may be captured as an audio file. The captured audio data may be processed to determine the content of the captured audio data. For example, the captured audio data may be processed using voice recognition software to determine the content thereof. It should be appreciated that the voice recognition software may be provided on the user device or may be provided at the server.

In step 411, the user device then transmits the processed user input data to the server 220, 230. This is in the scenario that the user device has voice recognitions software and has processed the captured audio input. Optionally, the user device 100 may also transmit further data about the user device 100, for example, location, time, date. The further data may be collected from the time the user input was made. Alternatively, the further data may be collected at the time the user input data is sent to the server 220, 230.

In some embodiments the user input may not be sent to the server and instead is provided to the memory 120 of a user device 100. In some embodiments, all or part of step 413 may be performed by the control part of the user device 100 accessing the extracted data within the user device 100, for example, stored in the memory 120 of the user device 100.

In step 413, the control part of the server 220, 230 may compare data of the user input with the desired data to verify that they match. The match may be determined based on a comparison of the processed user input data and the desired data. A further check may be made to see if one or more additional criteria are also met. The additional one or more criteria may comprise one or more of location and time. A match may require not only for the captured data to match the required data but also for one or more additional criteria to be satisfied.

In some embodiments, all or part of step 413 may be performed by the control part of the user device 100 accessing the processed captured user input data and/or the user device data within the user device 100, for example, stored in the memory 120 of the user device 100.

If the processing of the captured data does not take place in the user device, optionally, the control part of the server 220, 230 compares the captured user input data to the data of the user input request using a voice recognition software to determine if they match.

Comparing the processed data of the captured user input to the data of the user input request may comprise at least one, or any combination thereof, of comparing the entire phrase requested in the user request or a key part of the phrase requested.

The voice recognition software of a voice recognition module may be configured to distinguish between different translations of the requested phrase, regional or local dialects of the user(s).

In some embodiments, step 413 may be performed by the control part of the user device 100 accessing the processed user input data and/or the data of the user input request within the user device 100, for example, stored in the memory 120 of the user device 100.

In step 417, the control part of the server 220, 230 determines according to a predetermined rule whether a message should be transmitted to the user device 100. The predetermined rule may be based upon the result of a comparison in step 415. In some embodiments, one or more game conditions need to be satisfied. In some embodiments one or more social network criteria need to be satisfied.

The control part of the server 220, 230 determines according to a predetermined rule what message should be transmitted. This message could comprise, but is not limited to, at least one of:

promotional offers, for example, a promotional code or voucher, game lives, special features, new characters, special power-ups, secret levels, forum access, an unlock code for secret areas of a game, information about how many people in a geographic location have also completed the user request(s), a ranking for the user login. The ranking may be based upon how many users have previously submitted the user request, the speed of completion of the user request, how many user requests in total have been complied with. The message provided may be a combination of the options, for example, a ranking in the top 10 which leads to the message also containing a promotional offer.

In some embodiments, all or part of step 417 may be performed by the control part of user device 100 by accessing predetermined rules stored within the user device 100. In some embodiments, a message may be automatically transmitted if the user input data matches the further data of the user device.

If in step 413, the control part has determined that the user input data does not match the user request data then the control part of the server 220, 230 determines what message should be transmitted. This message could comprise, but is not limited to, at least one of:

sending instructions on how to meet the user request, how many more user requests need to be completed to meet the predetermined rule, instructions that the user has already completed this user request, instructions comprising clues or hints as to how to meet the predetermined rule, instructions comprising clues or hints as to how to achieve another reward, etc. In some embodiments, all or part of step 417 may be performed by the control part of user device 100 by accessing predetermined rules stored within the user device 100.

In step 419, the message is transmitted to the user device 100. In some embodiments where the previous steps are performed by the control part of the user device 100 no message needs to be sent to the user device 100. Instead the control part of the user device 100 proceeds directly to step 423.

In step 421, the user device 100 receives the message.

In step 423, the control part 115 of the user device 100 configures the data within the message for use in the user device 100. Configuring the data for use in the user device 100 may comprise rendering or altering data into a format that can be used by another feature of the user device, for example, rendering the data in the message for display on the display 155 of the user device in combination with the graphics controller module 125 and video output module 135, or converting the data into audio signals for output by the user device through the audio device 160. Alternatively, or additionally, configuring the data for use on the user device 100, may comprise configuring the message into instructions for a game module on the user device 100. In some embodiments, the control part of the server 220, 230 may configure the data so that it is transmitted in a useable form.

In some embodiments, the controller may access a local copy of the user details and "friend list" which has been stored from social network database 270 and retained on user device 100. In some embodiments, the processor of the user device 100 may determine whether an object is provided to a user, if so the processor of the user device may also determine what object or instructions should be transmitted to the user.

In step 425, the data is communicated to the user. Communicating the data to the user may comprise displaying data on the display 155 of the user device 100. Alternatively, or additionally, communicating data to the user may comprise producing sound through the audio output 160 of the user device 100.

It should be appreciated that various of the options described in relation to the embodiment of FIG. 3 may alternatively or additionally be used in conjunction with the embodiment of FIG. 4 and vice versa.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A method for providing a computer implemented game in a user device, the user device comprising at least one processor, a user input and a display, the method comprising:
receiving from a server information defining an audio input to be requested from a user;
displaying a message on the display relating to the requested audio input when the user device is at a predetermined location;
capturing by the user input an audio input provided by the user;
processing the captured audio input to determine a content of the captured audio input;
comparing the requested audio input and the content of the captured audio input; and
in response to determining a match between the requested audio input and the content of the captured audio input and determining that the user device is at said predetermined location, providing at least one game input for the computer implemented game.

2. A computer implemented method as claimed in claim 1, wherein requested audio input comprises one or more predetermined words.

3. A computer implemented method as claimed in claim 2, wherein the displayed message comprises the one or more predetermined words.

4. A computer implemented method as claimed in claim 1, comprising providing the at least one game input if a match is determined and if one or more other criteria is satisfied.

5. A computer implemented method as claimed in claim 4, wherein the one or more other criteria comprises one or more of: time and date.

6. A computer implemented method as claimed in claim 4, wherein the one or more other criteria comprises one or more game conditions.

7. A computer implemented method as claimed in claim 4, wherein the one or more other criteria comprises one or more social network criteria.

8. A method performed in a server, the server being arranged to communicate with a user device providing a computer implemented game, the method comprising:
- transmitting from the server to a user device information defining an audio input to be requested from a user;
- receiving from the user device an audio input provided by the user;
- processing the audio input to determine the content of the captured audio input;
- comparing the requested audio input and the content of the captured audio input; and
- in response to determining a match between the requested audio input and the content of the captured audio input and determining that the user device is at a predetermined location, transmitting information to the user device to provide at least one game input for the computer implemented game.

9. A user device comprising:
- a receiver configured to receive from a server information defining an audio input to be requested from a user;
- a display configured to display a message on the display relating to the requested audio input when the user device is at a predetermined location;
- a user input configure to capturing an audio input provided by the user; and
- at least one processor configured to process the captured audio input to determine a content of the captured audio input, to compare the requested audio input and the content of the captured audio input, and in response to determining a match between the requested audio input and the content of the captured audio input and determining that the user device is at said predetermined location, to provide at least one game input for the computer implemented game.

10. A user device as claimed in claim 9, wherein requested audio input comprises one or more predetermined words.

11. A user device as claimed in claim 10, wherein the displayed message comprises the one or more predetermined words.

12. A user device as claimed in claim 9, wherein the processor is configured to provide the at least one game input if a match is determined and if one or more other criteria is satisfied.

13. A user device as claimed in claim 12, wherein the one or more other criteria comprises one or more of: time and date.

14. A server comprising:
- a transmitter configured to transmit to a user device information defining an audio input to be requested from a user;
- a receiver configured to receive from the user device an audio input provided by the user;
- a processor configured to process the audio input to determine the content of the captured audio input, and to compare the requested audio input and the content of the captured audio input, wherein in response to the processor determining a match between the requested audio input and the content of the captured audio input and determining that the user device is at a predetermined location, the transmitter is configured to transmit information to the user device to provide at least one game input for a computer implemented game run on said user device.

* * * * *